United States Patent
Sadeghi-Emamchaie

(10) Patent No.: US 10,069,654 B2
(45) Date of Patent: Sep. 4, 2018

(54) METHODS TO MINIMIZE THE RECOVERED CLOCK JITTER

(71) Applicant: Huawei Technologies Co., Ltd., Shenzhen (CN)

(72) Inventor: Saeid Sadeghi-Emamchaie, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/936,996

(22) Filed: Nov. 10, 2015

(65) Prior Publication Data

US 2017/0134189 A1    May 11, 2017

(51) Int. Cl.
| | |
|---|---|
| H03D 3/24 | (2006.01) |
| H04L 7/00 | (2006.01) |
| H04L 25/03 | (2006.01) |
| H04L 27/26 | (2006.01) |

(52) U.S. Cl.
CPC .... *H04L 25/03057* (2013.01); *H04L 27/2627* (2013.01)

(58) Field of Classification Search
CPC ......... H04L 25/03885; H04L 25/03019; H04L 25/03006; H04L 7/0025; H04L 7/0337; H04L 27/2627; H04L 25/061; H04L 25/062; H04L 25/069
USPC ................................................. 375/376, 355
See application file for complete search history.

(56) References Cited

U.S. PATENT DOCUMENTS

| | | | |
|---|---|---|---|
| 7,005,901 B1 * | 2/2006 | Jiang | H03K 4/023 327/130 |
| 7,158,601 B1 * | 1/2007 | Chew | H03L 7/087 375/376 |
| 8,477,834 B2 | 7/2013 | Leibowitz et al. | |
| 8,811,553 B2 | 8/2014 | Leibowitz et al. | |
| 2002/0126604 A1 * | 9/2002 | Powelson | G11B 7/0045 369/47.53 |

(Continued)

FOREIGN PATENT DOCUMENTS

| | | |
|---|---|---|
| CN | 101662822 A | 3/2010 |
| WO | 2008063431 A2 | 5/2008 |

OTHER PUBLICATIONS

Stojanovic, V. et al., "Autonomous Dual-Mode (PAM2/4) Serial Link Transceiver with Adaptive Equalization and Data Recovery," IEEE Journal of Solid-State Circuits, vol. 40, No. 4, Apr. 2005, 15 pages.

(Continued)

*Primary Examiner* — Sam K Ahn
*Assistant Examiner* — Sarah Hassan
(74) *Attorney, Agent, or Firm* — Slater Matsil, LLP

(57) ABSTRACT

A circuit according to an embodiment includes a first slicer connected to an input port and a threshold circuit connected to a threshold port of the first slicer and configured to generate a first threshold voltage according to at least a first magnitude of a nominal value of a leading bit in a signal received at the input port. The first slicer is configured to slice the signal according to the first threshold voltage. In some embodiments, the threshold circuit calculates the first threshold voltage according to at least the first magnitude of the nominal value of the leading bit in the signal and a second magnitude of an interference voltage caused, in the leading bit, by a preceding bit.

19 Claims, 6 Drawing Sheets

(56) References Cited

U.S. PATENT DOCUMENTS

| | | | |
|---|---|---|---|
| 2003/0122600 A1* | 7/2003 | Engl | H03L 7/07 327/165 |
| 2004/0120426 A1* | 6/2004 | Dagdeviren | H04L 7/033 375/340 |
| 2004/0258183 A1* | 12/2004 | Popescu | H03H 15/00 375/350 |
| 2007/0126584 A1* | 6/2007 | Hyde | H04B 5/0062 340/572.4 |
| 2008/0080609 A1* | 4/2008 | Mobin | H04L 25/03057 375/233 |
| 2008/0191910 A1* | 8/2008 | Simpson | H03M 7/16 341/97 |
| 2011/0085081 A1 | 4/2011 | Tsai | |
| 2011/0311009 A1 | 12/2011 | Flynn et al. | |
| 2012/0269305 A1* | 10/2012 | Hogeboom | H04L 7/033 375/346 |
| 2013/0243070 A1* | 9/2013 | Ito | H04L 27/01 375/233 |
| 2014/0132320 A1 | 5/2014 | Sindalovsky et al. | |

OTHER PUBLICATIONS

Barry, J.R. et al., "Digital Communications," Third Edition, Springer Science & Business Media, L.L.C., 2003, 8 pages.

\* cited by examiner

METHODS TO MINIMIZE THE RECOVERED CLOCK JITTER

TECHNICAL FIELD

The present invention relates generally to decision-feedback equalization based receivers and more particularly, to techniques for establishing and adaptively adjusting a sampling clock phase for decision feedback equalization.

BACKGROUND

In a modern wireline high-speed digital communication system, data is transmitted at a very high rate. A typical high-speed digital link may send the binary data at 25 Giga bit per second (Gbps) or higher. In a 25 Gbps link for example, information in the form of 0 and 1 (bits) are sent at a speed of 1 bit per 40 picoseconds. In this example, 40 picoseconds is the time interval, also called bit-width or unit interval (UI), over which one bit of information is transmitted. The signal at the receiver is distorted by the bandwidth limited channel (channel loss) causing inter-symbol interference (ISI), jitter or the uncertainty in the exact timing of the transmitter clock edges resulting in uncertainty in exact timing of the transmitted data, crosstalk such as interference by adjacent links, and noise.

To recover the transmitted data with low error probability, the received distorted analog signal is equalized and sampled according to a clock signal recovered from the received signal using a clock and data recovery (CDR) circuit. A commonly used technique to remove the ISI without amplifying the noise and crosstalk is called decision feedback equalization (DFE.) A detailed description of the decision-feedback equalizers, can be found in, for example J. R. Barry, E. A. Lee and D. G. Messerschmitt, *Digital Communication*, vol. I, Springer Science & Business Media, LLC, 2004. A DFE circuit receives data retrieved by slicer. The DFE circuit removes the ISI from the signal prior to sampling by continuously generating the same ISI caused by previously recovered data and subtracting the generated ISI from the received signal. However, successful recovery of the transmitted data using DFE is strongly dependent on optimal and adaptive adjustment of the sampling clock signal in the CDR. As such, the sampling clock phase must be accurate and with minimum uncertainty and jitter.

SUMMARY

A circuit according to an embodiment includes a first slicer connected to an input port and a threshold circuit connected to a threshold port of the first slicer and configured to generate a first threshold voltage according to at least a first magnitude of a nominal value of a leading bit in a signal received at the input port. The first slicer is configured to slice the signal according to the first threshold voltage. In some embodiments, the threshold circuit calculates the first threshold voltage according to at least the first magnitude of the nominal value of the leading bit in the signal and a second magnitude of an interference voltage caused, in the leading bit, by a preceding bit.

A circuit according to an embodiment includes a plurality of slicer systems, each of the slicer systems having a first slicer connected to an input port and a second slicer connected to the input port in parallel with the first slicer. A threshold circuit is connected to a first threshold port of the first slicer and to a second threshold port of the second slicer, and a first multiplexer is connected to outputs of the first slicer and the second slicer. A second multiplexer is connected to an output of the first multiplexer of each of the plurality of slicer systems. In an embodiment, the threshold circuit has circuitry that generates a first threshold voltage according to at least a first magnitude of a nominal value of a leading bit of an input signal and a second magnitude of an interference voltage caused, in the leading bit, by a preceding bit and provides the first threshold voltage to the first slicer at the first threshold port.

A method according to an embodiment includes generating, in a slicer system, a first threshold voltage according to at least a first magnitude of a nominal value of a leading bit of an input signal and further according to a second magnitude of an interference voltage caused, in the leading bit, by a preceding bit. The method further includes providing the first threshold voltage to a first slicer of the slicer system at a first threshold port of the first slicer, receiving the input signal at the first slicer; slicing, by the first slicer, the input signal according to the first threshold voltage, the slicing generating a first output signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Additionally, the methods and apparatuses described may be applied to two-level signaling such as pulse amplitude modulation/non-return-to-zero (PAM2/NRZ) signaling, but are not specifically limited to the same and can be extended to multilevel signaling such as PAM4.

In order to reliably recover data from a high-speed signal, particularly a signal without an accompanying clock signal or reference signal, the clock signal is recovered from the data signal by analyzing the transitions between successive bits. A non-return-to-zero (NRZ) signal may indicate a "1"

bit with a positive voltage, and a "0" bit with a negative voltage, and avoid other neutral or rest conditions. Such NRZ signals are generally sent without a clock signal. In other examples, a "1" bit may be denoted by a positive or negative voltage, and a "0" bit may be denoted by a 0 voltage. Recovery of a clock or timing signal at the receiver is performed by detecting when the data signal transitions from a "1" bit to a "0" bit, or from a "0" bit to a "1" bit. However, the ISI causes the transitions to spread over a significant portion of the bit interval. Uncertainty in transmitter clock and also noise induced by the adjacent links also contribute to the variation of these transitions. On particularly high speed links, these variations in transitions between bit states introduce uncertainty, or "jitter" into the recovered clock signal, causing error in the recovered bits.

Figure 1:
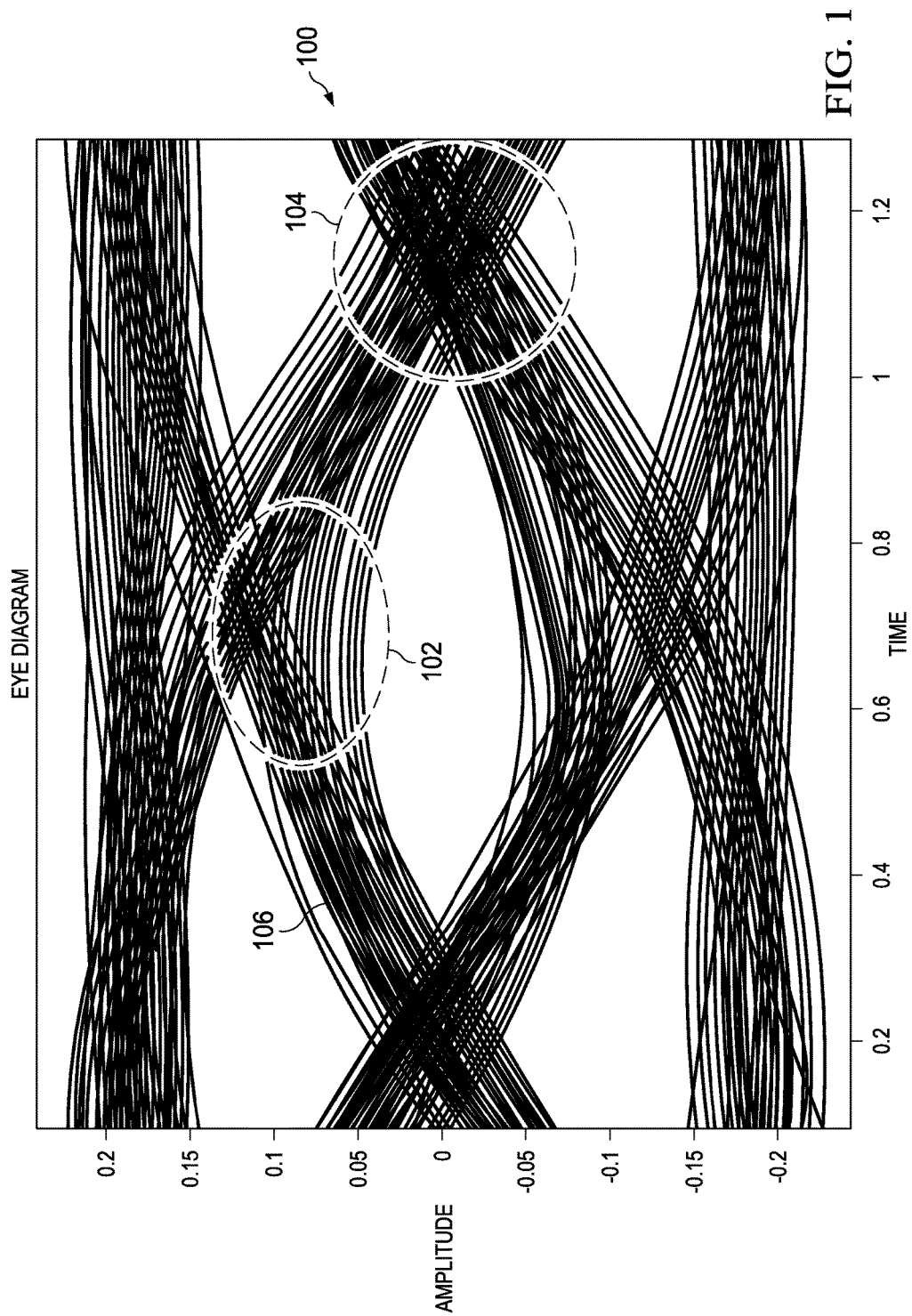
FIG. 1 is an eye diagram illustrating multiple overlaid received signals and the relationship to signal acquisition.

FIG. 1 is an eye diagram 100 illustrating multiple overlaid received signals 106. The eye diagram 100 illustrates multiple overlaid received signals with the same reference point in time and same duration (1 bit period in this drawing) and the same relationship to signal acquisition. A received data signal is optionally run through a linear equalizer such as a Continuous Time Linear Equalizer (CTLE) in the receiver and/or through a pre-emphasis filter in the transmitter to reduce the distortion caused by the bandwidth limited channel (ISI). One efficient way to check the quality of the equalized signal is to plot an eye diagram 100 of the signal after equalization. To generate an eye diagram, a portion of the signal (e.g. 1000 unit intervals (UI)) is divided into 1-UI long pieces, and then superimposed on a graph. Thus, the eye diagram 100 illustrates multiple overlaid portions 106 of the equalized signal, permitting observation of the quality of the equalized signal. Generally the larger the eye opening after the equalization, the higher the quality of the equalization and the lower the probability of error in recovering the data correctly. This is because larger eye opening is the result of the smaller variation of the overlaid portions from each other both horizontally, an indication of the reduced timing uncertainty or jitter, and vertically, an indication of the reduced noise.

Figure 3A:
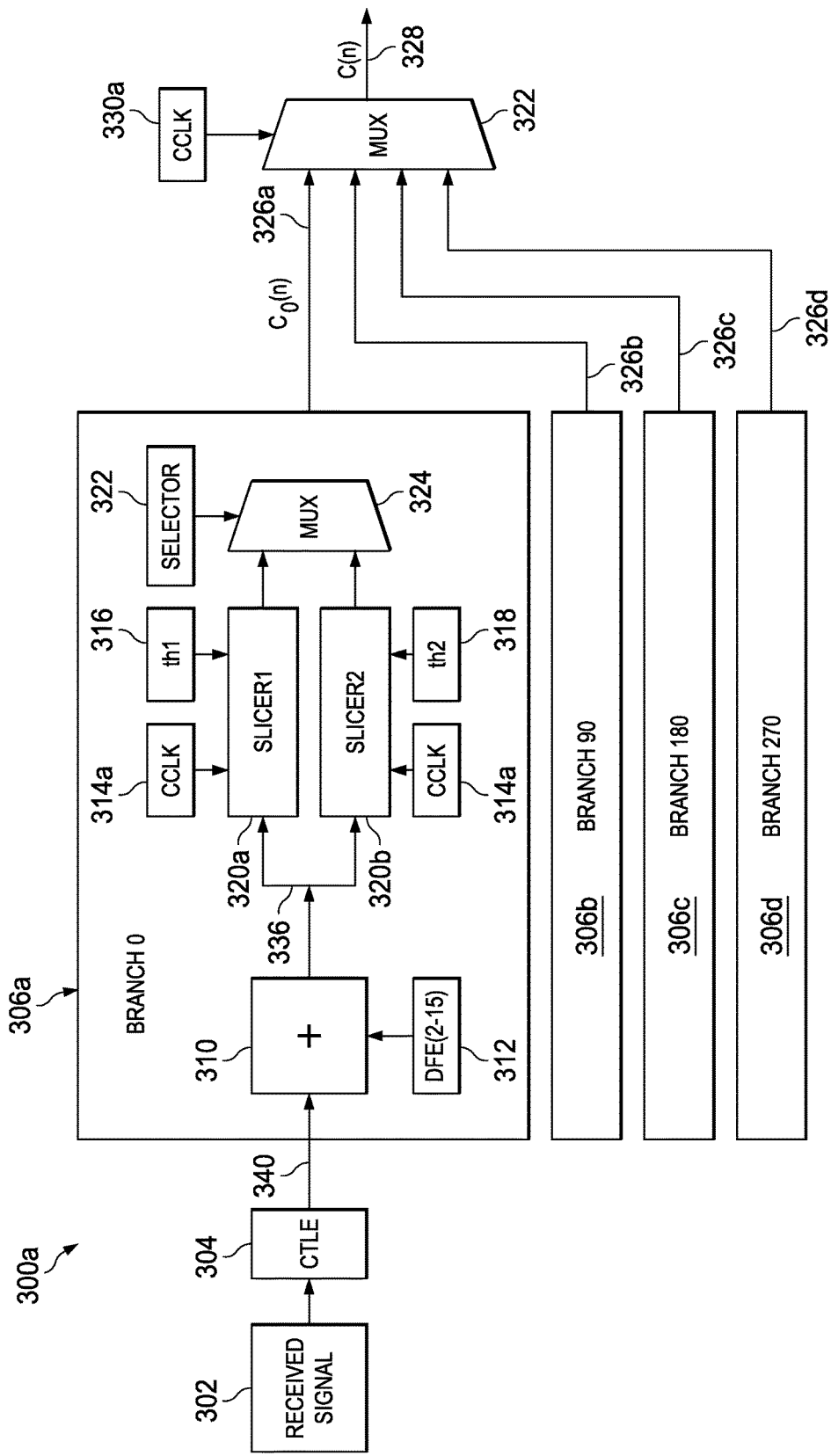
FIG. 3A is a diagram illustrating the center path of a quarter-rate receiver system according to some embodiments.
Figure 3B:
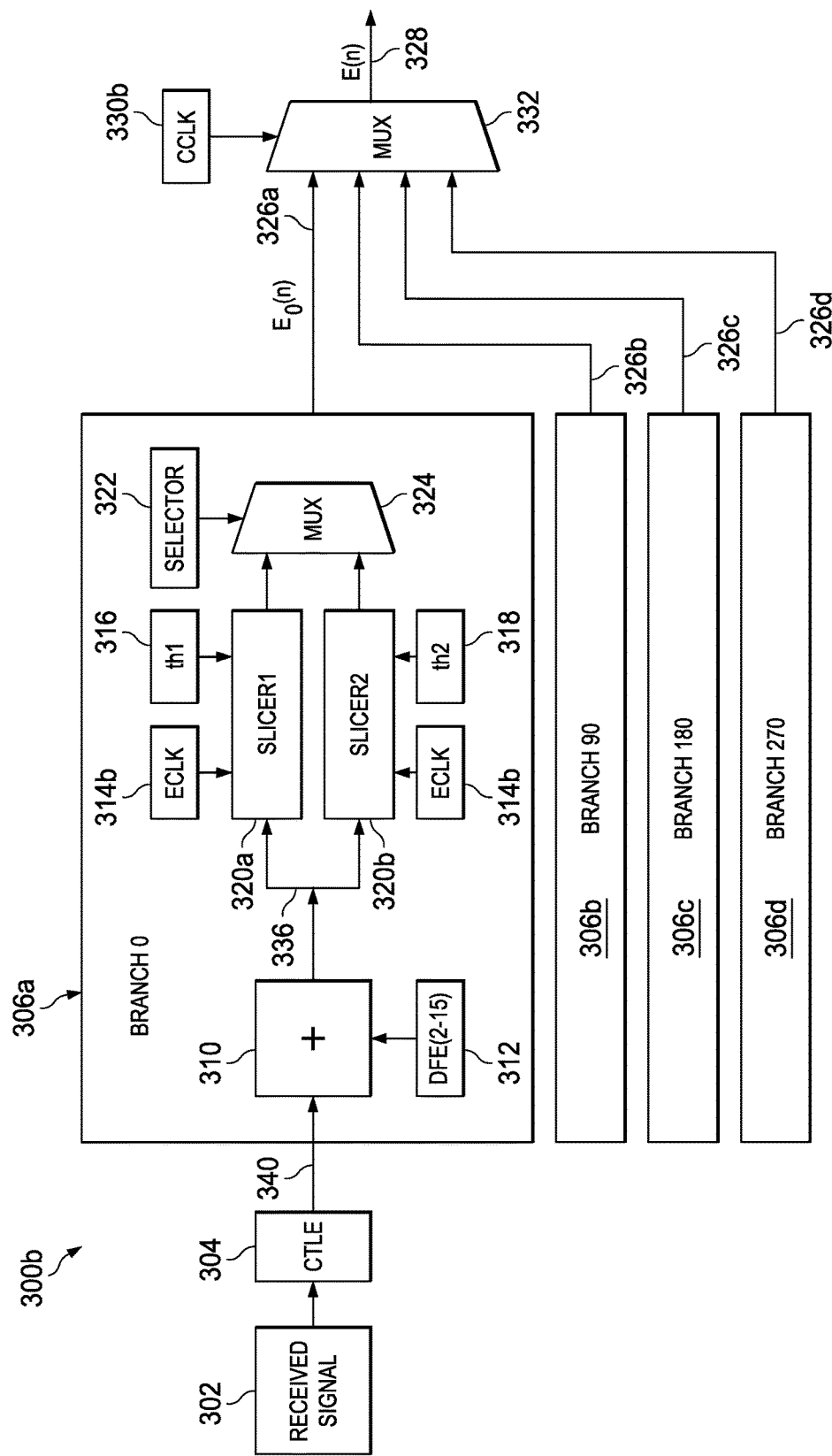
FIG. 3B is a diagram illustrating the edge path of a quarter-rate receiver system according to some embodiments.

A clock recovery technique uses two samples per unit interval of the received signal, one at the center of the eye 102 and the other at one edge of the eye 104. The samples are obtained by processing the signal through two path circuits, called the center path and the edge path, which are shown in FIGS. 3A and 3B respectively, and which are described in greater detail below. The equalized signal is sampled in the center path by the receiver clock, also called the center clock, to retrieve center data, which should ideally match the transmitted data when the data recovery is successful. The equalized signal is also sampled in the edge path by the edge clock, to generate the edge data. In two-level signaling, for example, where bits 1 and 0 are sent by a positive voltage level and another equal but negative level, respectively, the value of each sample is compared to 0. If the value of each sample is greater than 0 for a particular sample, a bit "1" is detected and if the value of each sample is less than 0, a bit "0" is detected. This operation is called slicing. To minimize the probability of the error, the center clock must sample the equalized signal at or close to the middle of the eye 102. Adjusting the phase and frequency of this clock continuously to compensate for the variations in the response of the channel or to track the slow variation in the transmitter clock phase is highly crucial for proper operation of the receiver. Establishing an adaptive adjustment of the phase and frequency of the sampling clock is performed by the Clock and Data Recovery (CDR) element. The CDR is expected to perform reliably even during the initial phase of the equalizer adaptation when the signal is not quite equalized yet and is still highly distorted. To recover the clock phase and frequency, the edge and center data are first processed by a phase-detector (PD). A commonly used PD in high-speed wireline digital communication receivers is called Bang-Bang PD (BBPD). This type of PD receives the center and edge data and by comparing them, continuously determines the direction by which the edge clock phase has to be adjusted. The phase of the center clock phase is then determined in relationship to edge clock phase. As a result of the processing of the PD input by the CDR, the edge clock position (phase) gradually converges to the median of the transitions zero-crossings in the edge of the eye 104. The median point is the point having an equal number of transitions cross zero at the right as at the left. The recovered edge clock phase, however, varies with time around this median point due to inherent uncertainty of the position of the transitions zero crossings. This uncertainty is higher if the zero crossings have higher spread or variance. The BBPD output signal level is directly proportional to the deviation of the edge clock sampling phase from the ideal position (median of the transitions zero-crossings).

A PD gain is defined as the ratio of its output signal to the deviation of the edge clock phase position from the ideal position. In general, for a given link and equalization setting, a PD with higher gain is more desirable than a PD with lower gain since, for the same deviation of the clock edge from the ideal phase, the PD generates a larger output signal, resulting in faster correction of the clock phase and less phase uncertainty or jitter.

Figure 2:
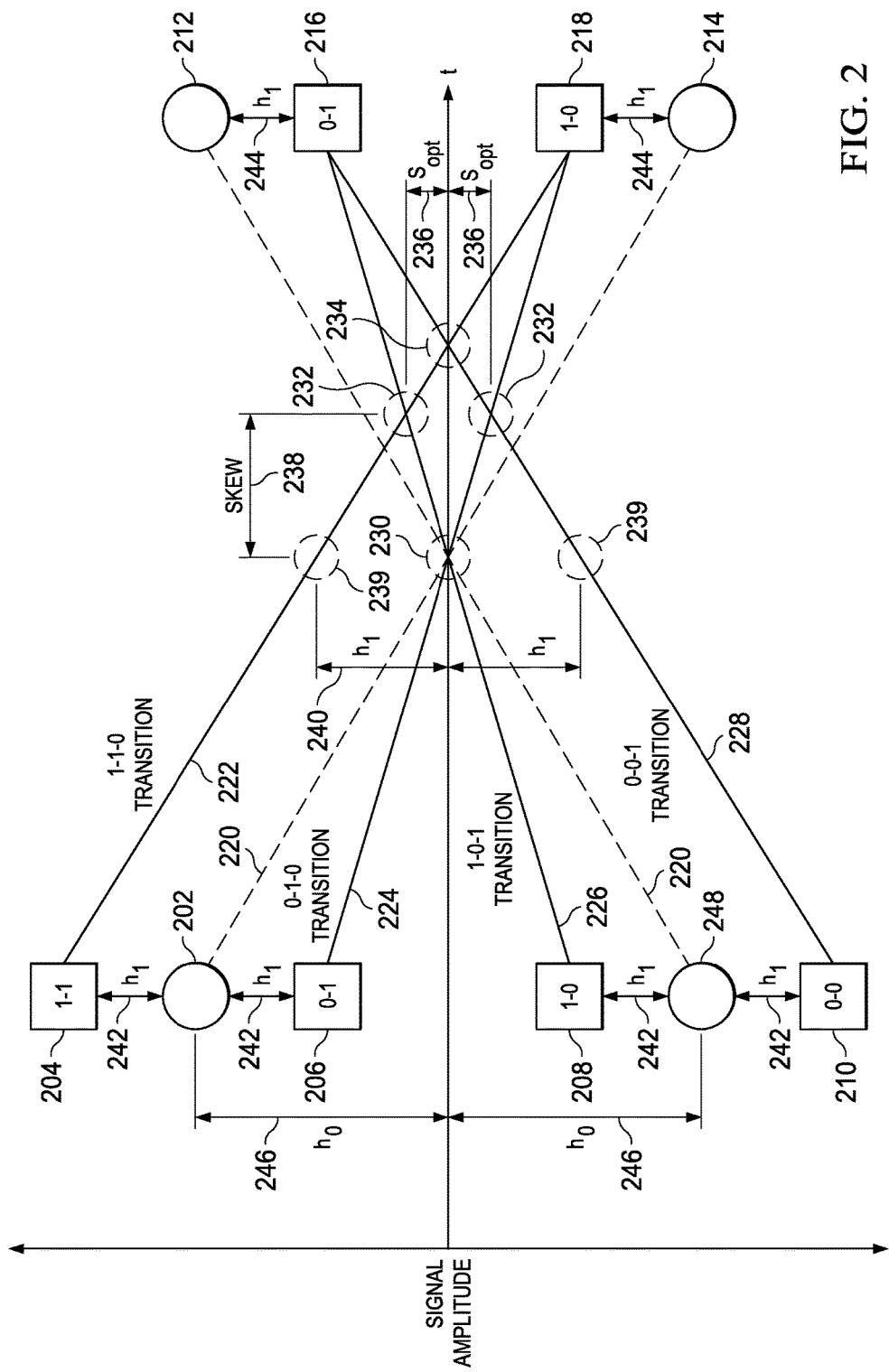
FIG. 2 is a diagram illustrating signal transitions and edge path slicer threshold levels according to some embodiments.

FIG. 2 is a diagram illustrating signal transitions and edge path slicer threshold levels according to some embodiments. In some embodiments, such signal transitions are used to determine a slicing point in the receiver of a two-level signaling system. For simplicity, and without any loss of generality, the only impairment shown is the ISI caused by the previous bit. A transition occurs when two successive bits are of different value, e.g. 0 and 1 or 1 and 0. Normal leading, or current, bit values 202 and 248 are two possible values of the leading, or current bit corresponding to "1" and "0" with the nominal bit value heights of $h_0$ and $-h_0$ 246 respectively when there is no impairment. Similarly, subsequent, or new, bit values 212 and 214 are two possible values of the trailing or subsequent bit corresponding to ideal values of "1" and "0" when there is no impairment. Ideal transitions 220 transition between normal leading bit values 202 and 248 at voltage levels $h_0$ 246 to the subsequent bit values 212 and 214. The transitions 220 illustrate the transition between opposite bit values when the normal bit values are not raised or lowered by interference such as ISI.

However, ISI causes the nominal leading bit values 202 and 248 of a leading bit to vary from the nominal bit value $h_0$ 246 by an interference voltage $h_1$ 242 which is the ISI caused by the bit immediately preceding it. Interfered leading bit values 204, 206, 208 and 210 deviate from the ideal, normal, or nominal leading bit values 202 and 248 due to interference from a bit that precedes the leading bit (not shown here for clarity) based on the value or level of the preceding bit. For example, leading bit value 204 represents a case where preceding and leading bits are both 1, and is referenced by sequence 1-1. In this case, the leading bit value 204 deviates from the normal or nominal high bit value 202 at $+h_0$ 246 by a positive interference voltage $h_1$ 242 due to the value of the bit preceding (not shown) the leading bit value 204 being high.

Similarly, the leading bit value 206 is a result of preceding bit being 0, where the leading bit value 206 is below the value of the normal or nominal high bit value 202 at +h₀ 246, deviating by a negative ISI voltage $-h_1$ 242 from the normal high bit 202 value. This has been noted by sequence 0-1 beside the interfered leading bit value 206.

Similarly low or "0" leading bit values 208 and 210 deviate from ideal value of $-h_0$ 248 by $+/-h_1$ 242, due to ISI caused by the preceding bit. This has been noted by sequence 1-0 beside the interfered leading bit value 208 and sequence 0-0 beside the interfered leading bit value 210.

For cancelling the ISI caused by the immediately preceding data (bit or symbol) on the current bit, as soon as the value of the preceding (interfering) bit is known there is only a fraction of a bit time (typically 0.5 UI) available to generate the correction signal to remove its ISI from the incoming bit. A technique called speculative or loop-unrolled architecture, described in greater detail below, can be used to dynamically remove from a bit the ISI introduced by the preceding bit. Additionally, to ease the problem of processing the received signal at such a high speed, the received signal can be processed by N identical paths, each running with (1/N)th of the clock speed that would have been required in a single path architecture. Circuits for processing a signal in such a manner are illustrated in FIGS. 3A and 3B. FIG. 3A shows the center path 300a of a quarter-rate receiver system architecture for two-level signaling (NRZ or PAM2) according to some embodiments. FIG. 3B shows the edge path 300b of a quarter-rate receiver system architecture for two-level signaling (NRZ or PAM2) according to some embodiments. While the circuits are described as being for center path 300a and edge path 300b circuits of a quarter-rate receiver system architecture for two-level signaling (NRZ or PAM2), it should be understood that the techniques disclosed herein can easily be extended to different rate architecture, such as half-rate or octal-rate, or the like, and also multilevel signaling such as PAM4, etc.

In both the center path 300a and edge path 300b, a received signal 302 is first equalized optionally by a CTLE 304 and then processed by four parallel branches that are each a quarter-rate slicer system 306a . . . 306d. This allows each quarter-rate slicer system 306a . . . 306d to work with a clock speed of one fourth of the data speed of the received signal. The clock phase of the quarter-rate slicers systems 306a . . . 306d are 90° apart relative to each other. This has been noted by labeling the branches, 0, 90, 180 and 270 respectively which refers to their respective clock phases. For example for a 25 Gbps receiver, the clock at each branch of the slicer system 306a . . . 306d will have a 6.25 GHz speed. While a high speed signal flows through all the branches, each branch is designed to DFE equalize every fourth bit. Each branch slicer system 306a . . . 306d has a summer 310 connected to an input port 340. The summer 310 adds DFE correction for the post-cursor ISI terms (terms 2-15, caused by 14 consecutive bits received before the preceding bit) 312 to the CTLE 304 output. Thus, the signal at the summer output 336 is without the interference caused by the bits received before the preceding bit and is mainly affected, by the immediately preceding bit, which is often the largest ISI term.

Referring to FIG. 3A, in the center path 300a, to eliminate the ISI caused by the preceding bit the output of the summer 310 is sliced by two slicers 320a, 320b connected in parallel to the summer 310. The slicers 320a, 320b may also be referred to as decision slicers, decision latches, soft-decision slicers, hard-decision slicers, decision devices, signal slicers, or the like. The slicers 320a and 320b have a first input that receives an input signal from the summer 310, and also have a second input such as a threshold port to receive a threshold level th1 316 or th2 318. Slicers 320a, 320b also have a clock port 314 connected to the respective quarter rate center clock. The center path 300a thresholds th1 316 and th2 318 are set to the estimates of the first ISI term $h_1$ and $-h_1$ 242, respectively. These estimates are provided by an adaptation block not shown here, but are described, for example, in Stojanovic et al. "Autonomous Dual-Mode (PAM2/4) Serial Link Transceiver With Adaptive Equalization and Data Recovery," *IEEE Journal of Solid-State Circuits*, Vol 40, No. 4, April 2005, pp. 1012-1026, which is incorporated herein by reference. With the threshold th1 316 of the slicer 320a set to $h_1$ 242, at the edge of the center clock CCLK 314 signal, the slicer 320a generates a "1" if the signal is greater than $h_1$ and "0" otherwise. Equivalently, $h_1$ 242 can be subtracted from the signal at the input to the slicer 320a and the result is compared to a threshold of "0" to generate the output. Therefore, the output of the slicer 320a will be the desired signal with ISI of the preceding bit cancelled if the preceding bit is "1". Similarly, with the threshold th2 318 of the slicer 320b set to $-h_1$ 242, at the edge of the center clock CCLK 314 signal, the slicer 320b generates a "1" if the signal is greater than $-h_1$ 242 and "0" otherwise. Equivalently, $-h_1$ 242 can be subtracted from the signal at the input to the slicer 320b and the result is compared to a threshold of "0" to generate the output. Therefore, the output of the slicer 320b will be the desired signal with ISI of the preceding bit cancelled if the preceding bit is "0" ("-1" in a NRZ signaling system). The selection of the correct decision is made by the multiplexer 324 which has the preceding bit C(n−1) as the selector 322.

In a quarter-rate architecture, the above mentioned process is performed by one of the four branches that are each quarter-rate slicer systems 306a . . . 306d at a time. For example at time n, where n refers to n-th bit interval, a first branch 306a running with a center clock at zero degree offset (CCLK0) processes the data while the preceding retrieved bit C(n−1), used as the selector 322 of the multiplexer 324, has been generated by the fourth branch 306d. In the next bit interval, n+1, a second branch 306b running with a center clock at a 90° offset (CCLK90) processes the data while the preceding retrieved bit C(n), used as the selector 322 of the multiplexer 324 of the second branch, has been generated by the first branch and so on.

The outputs 326a . . . 326d of the multiplexers 324 of each quarter rate slicer system 306a . . . 306d of the four branches are used as inputs to a group multiplexer 332 that selects the correct bit at each bit interval by rotating from the output of branch 0 to 90 to 180 to 270 according to, for example, a clock signal 330a received at a selector port from a clock signal source which is synchronized in phase with slicer clocks. The resulting output 328 is the center path data stream (ideally matching the transmitted data) which is also used by the CDR to continuously adapt the edge and center clock phases.

The edge path 300b shown in FIG. 3B processes signal at the summer output 336 to slice the transitions between bit levels for recovery of the center and edge clocks. As shown in FIG. 2, the actual transitions 222, 224, 226, 228 of the signal from the possible leading bit values 204, 206, 208, 210 to the possible subsequent bit values 216 and 218 depend on both the actual value of the leading bit values 204, 206, 208, 210 and the subsequent bit values 216 and 218. Transition 222 is a 1-1-0 transition that is the result of a "1" bit preceding a "1" leading bit value 204 transitioning to a "0" new bit value 218. Similarly, transition 224 is a 0-1-0 transition that is the result of a "0" bit preceding a "1" leading bit transitioning to a "0" new bit 218, transition 226 is a 1-0-1 transition that is the result of a "1" bit preceding a "0" leading bit value 208 transitioning to a "1" new bit 216, and transition 228 is a 0-0-1 transition that is the result of a "0" bit preceding a "0" leading bit transitioning to a "1" new bit 216.

In an NRZ signaling system, the transitions 224 and 226 cross the zero voltage or center line at about the same zero crossing point 230 as the ideal transitions 220. However, the transitions 222 and 228 cross the zero axis at much later zero crossing point 234 that is different from the ideal zero crossing point 230.

Recovering edge clock data from both the first zero crossing point 230 and second zero crossing point 234 results in two modes in the histogram (called bimodality) of the zero-crossings, which leads to high phase variance and uncertainty (jitter) in the recovered clock. This edge path zero-crossing histogram bimodality also results in low PD gain. Thus, PD sensitivity against deviation of the recovered edge clock phase from ideal position is reduced. In some embodiments, slicing the edge path signal according to the magnitudes of interference value $h_1$ and nominal bit value $h_0$, using the edge path 300b (see FIG. 3B), permits the use of all transitions of the signal from "0" to "1" and "1" to "0", and results in a unimodal distribution of the zero crossings with two slicers. Thus, the edge path 300b in the described embodiments avoids the bimodality of the histogram of the zero-crossings, and uses all of the transitions instead merely of using the 0-1-0 transition 224 and 1-0-1 transition 226 and discarding the other transitions (the 1-1-0 transition 222 and 0-0-1 transition 228) or vice versa. Additionally, the edge path 300b two slicers avoids using a third slicer, where the threshold of one slicer would be set to "+$h_1$" to slice the transition 222 at the +h threshold 239, the threshold of another slicer would be to "−$h_1$" to slice the transition 228 at the −h threshold 239, and the threshold of the third slicer would be set to '0' to slice the remaining transitions 224 and 226 at zero crossing point 230.

In FIG. 2, transitions 222 and 226 intersect at intersection point 232 (above the time axis). It is also noted that transitions 224 and 228 intersect at point 232 (below the time axis). Due to the symmetry, these two intersect points are aligned in time and have the same distance with respect to the time axis with different signs. The transitions 222 and 226 are the results of the 1-1-0 and 1-0-1 bit sequences, respectively. In both transitions 222 and 226, the preceding bit, or the bit before the leading bit, is "1." Since the transitions 222 and 226 transition from interfered leading bit values 204 and 208 that are based on complementary normal leading bit values 202 and 248, transitions 222 and 226 are complimentary. Additionally, since the transitions 222 and 226 transition from interfered leading bit values 204 and 208 that are interfered by interference voltages 242 having the same polarity, transitions 222 and 226 are similarly interfered. Thus, transitions 224 and 228 are possible transitions in a signal that are complimentary and similarly interfered, and intersect at intersection point 232. Additionally, the transitions 224 and 228 are the results of the 0-1-0 and 0-0-1 bit sequences, respectively. In both transitions 224 and 228, the preceding bit, or the bit before the leading bit, is "0". Since the transitions 224 and 228 transition from interfered leading bit values 206 and 210 that are based on complementary normal leading bit values 202 and 248, transitions 224 and 228 are complimentary. Additionally, since the transitions 224 and 228 transition from interfered leading bit values 206 and 210 that are interfered by interference voltages 242 having the same polarity, transitions 224 and 228 are complimentary. Thus, transitions 224 and 228 are possible transitions in a signal that are complimentary and similarly interfered, and intersect at intersection point 232. The height of these intersection points 232, is $S_{opt}$ 236, and is determined based on the magnitudes of values $h_0$ and $h_1$ as shown in the following equation:

$$S_{opt}=(h_0-h_1)h_1/(2h_0-h_1) \quad (1)$$

The intersection points 232 are skewed by a skew 238 with respect to the ideal zero-crossing position 230 at the mid-point between the leading and subsequent bit. This skew 238 is determined by the following equation:

$$Skew=h_1T/2(2h_0-h_1) \quad (2)$$

Where T is the bit period (UI).

In the edge path 300b shown in FIG. 3B, the thresholds th1 316 and th2 318 of the slicers 320a and 320b, are set to +$S_{opt}$ and −$S_{opt}$ 236 (FIG. 2), respectively, where $S_{opt}$ 236 is given in equation (1). Equivalently, +$S_{opt}$ can be subtracted from the signal at the input to the slicer 320a and the result is compared to a threshold of "0" to generate the output and −$S_{opt}$ can be subtracted from the signal at the input to the slicer 320b and the result is compared to a threshold of "0" to generate the output. Using this equivalent implementation, zero-crossing refers to the time instant where a transition crosses the threshold of the slicer. Therefore by setting the thresholds th1 316 and th2 318 of the slicers 320a and 320b, to +$S_{opt}$ and −$S_{opt}$ 236 (FIG. 2), respectively, zero-crossings at point 232 (FIG. 2) occur. Similar to the center path 300a, in the edge path 300b, the multiplexer 324 is controlled based on the value of the previous bit C(n−1). Thus, in the edge path 300b, at each bit interval, the output of the slicer 320a is selected if the preceding bit (the bit received before the leading bit) is "1", and output of the slicer 320b is selected otherwise. Therefore, this embodiment of the edge path 300b unifies the two modes of the histogram of edge path zero-crossings and produces only one mode, resulting in high PD gain and minimum uncertainty and jitter in the recovered edge clock without the need for discarding any transitions or an extra slicer.

Figure 6:
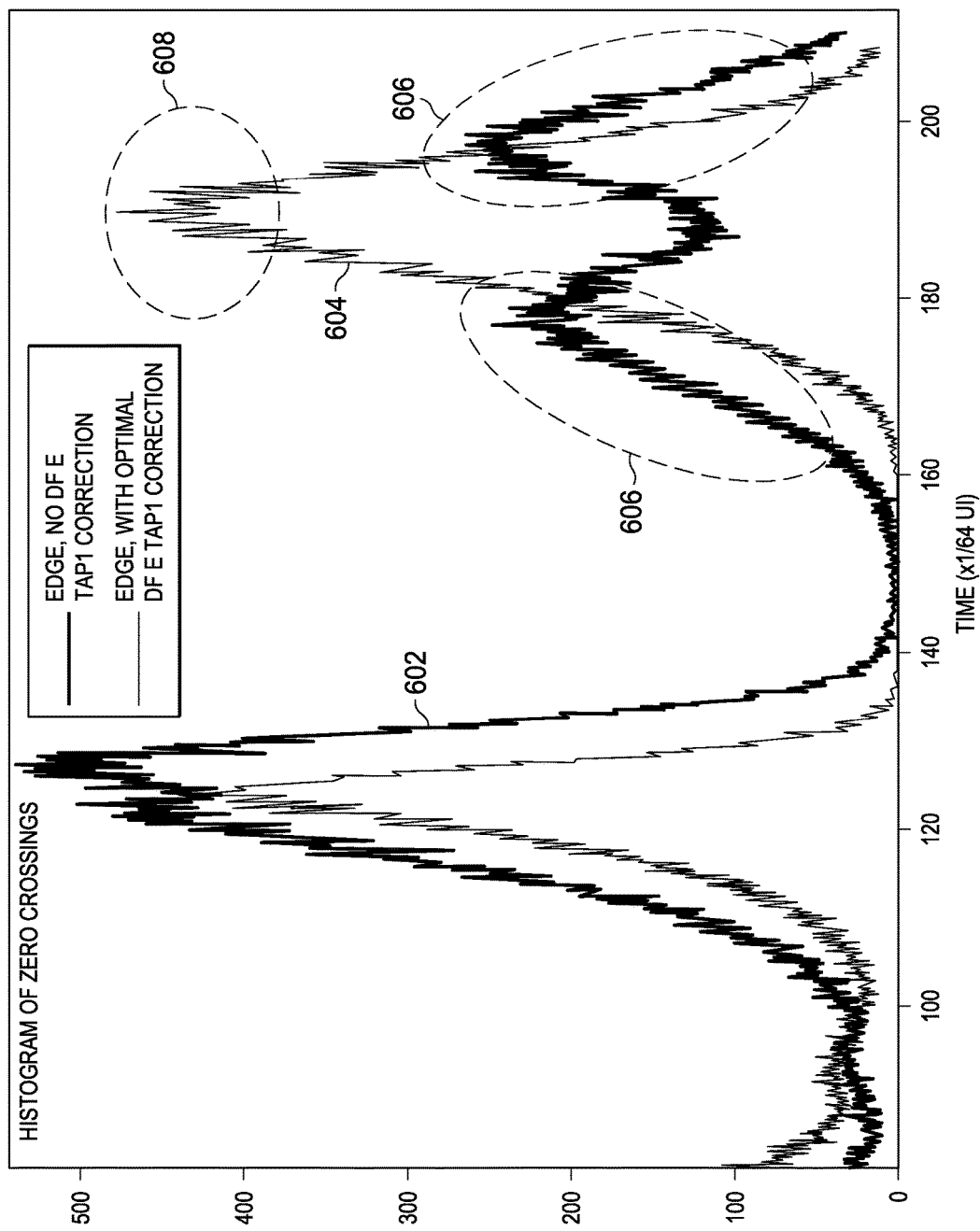
FIG. 6 is a histogram illustrating the distribution of the zero-crossings of the edge path 300*b* signal according to some embodiments.

FIG. 6 is a histogram illustrating the distribution of the zero-crossings of the edge path 300b signal according to some embodiments. This histogram displays the edge path zero-crossing distribution for a typical 25 Gbps link where the first ISI term, $h_1$ 242, is about 40 percent of the $h_0$ 246, ($h_1/h_0$~40%). The histogram of the edge path 300b zero-crossings where threshold of the slicers 320a and 320b of the edge path (FIG. 3B) are set to the "0" is marked by 602. The two modes of the edge data distribution 606 as described above, results in high uncertainty and jitter of the recovered edge and center clocks. These two modes are the results of two main zero crossings 230 and 234 shown in FIG. 2. The second histogram 604 represents the distribution of the zero-crossings, where the thresholds of the slicer 320a and 320b of the edge path 300b, are set to +$S_{OPT}$ and −$S_{OPT}$, according to the disclosed embodiment. In this case, the histogram has one mode 608 with much less dispersion resulting in high gain of PD and much lower variance and uncertainty in the recovered clock phase. This unimodal histogram is the result of sampling the transitions at optimal intersection points 232 in FIG. 2 as described in detail above.

Referring again to FIG. 3B, similar to the operation of the center path, the edge path slicing process is performed by one of the branches 306a . . . 306d at a time. For example, at time n, where n refers to nth bit interval, first branch 306a running with an edge clock at zero degree offset (ECLK0) processes the data. The preceding retrieved data bit C(n−1)

is used as the selector 322 of the multiplexer 324. This bit is provided by the fourth branch 306d of the center path. In the next bit interval, n+1, the second branch 306b of the edge path 300b running with the edge clock at a 90° offset (ECLK90) processes the data with the preceding retrieved bit C(n), provided by the first branch 306a of the center path 300a is used as the selector 322 of the MUX 324 and so on. The outputs 326a . . . 326d of the multiplexer 324 of each of the four branches 306a . . . 306d of the edge path 300b are used as inputs to a group multiplexer 332 that selects the correct output at each bit interval by rotating from the output of branch 0 to 90 to 180 to 270. The output 328 is rotated according to, for example, a clock signal 330b received at a selector port from a clock signal source which is synchronized in phase to slicer clocks 314b (FIG. 3B). The resulting output 328 is the edge path data stream which is used by CDR to continuously adapt the edge and center clock phases.

The center clock phase is determined based on the edge clock phase, as described above. To compensate for the skew 238 of the intersection points 232 shown in FIG. 2, a phase difference of 1/2UI+Skew is maintained between the center clock phase and the edge clock phase, where skew value is given in Equation 2. This ensures the edge clock phase converges to the ideal "mid-point" between the two bits.

Figure 4:
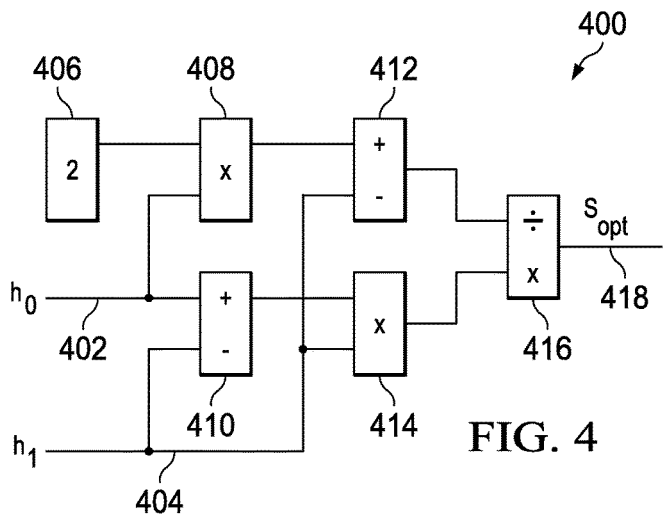
FIG. 4 is a diagram illustrating a circuit for calculating a slicer threshold for the edge path according to some embodiments.

FIG. 4 is a diagram illustrating a threshold circuit 400 for calculating the slicer threshold $S_{opt}$ according to the exemplary embodiment. In this embodiment, the threshold circuit 400 is connected to the slicers 320a, 320b of the edge path (FIG. 3B) and implements Equation (1) to provide an $S_{OPT}$ signal 418 that may be used as a threshold for slicers 320a, 320b. In this embodiment, the threshold circuit 400 generates a positive $S_{OPT}$ signal. The positive $S_{OPT}$ signal may be negated, or multiplied by −1 to generate a negative $S_{OPT}$ signal. The positive and negative $S_{opt}$ signals are delivered to the slicers 320a, 320b of the edge path (FIG. 3B), respectively.

While the calculation of the $S_{opt}$ signal 418 for use as a threshold voltage is shown using discrete components in a dedicated circuit, it should be understood that such an embodiment is meant to be illustrative, and is not limiting. One or more components 406-416 may be implemented as digital components, analog components or circuits, or software instructions stored on a non-transitory computer readable medium and executed by a processor.

Thus, the described embodiments result in unimodal distribution of the edge path data and provide the recovered edge and center clocks with minimum jitter and no skew, without any need for extra slicer or any need to discard the transitions.

In another embodiment, two slicers 320a, 320b of the edge path 300b (FIG. 3B) are used to slice the received signal to obtain the edge data. One slicer (e.g. first slicer 320a) slices at "0", i.e. th1 316 is set to "0" and the threshold th2 318 of the second slicer 320b alternates between "+$h_1$" and "−$h_1$." The second slicer threshold th2 318 may be set to "+$h_1$" for certain number of bits, e.g. 4000 bits then this threshold is switched to "−$h_1$" for the same number of bits. The first slicer 320a with its threshold set to "0" generates the edge data for the transitions 224 and 226 (FIG. 2). The transitions 224 and 226 cross the "0" threshold exactly at the ideal midpoint, which is zero-crossing point 230. The transition 222 crosses the "+$h_1$" threshold 239 at exactly the ideal midpoint in time while the transition 228 crosses the "−$h_1$" threshold 239 at the same ideal midpoint in time. According to this embodiment, in the edge path 300b (FIG. 3B), the output of the first slicer 320a, with its threshold set to "0" is selected by the multiplexer 324, if the preceding and leading bits are "0" and "1" or "1" and "0" respectively. Multiplexer 324 selects the output of the second slicer 320b if threshold th2 318 is set to "+$h_1$" and the preceding and leading bits are both "1" or if the second slicer's threshold th2 318 is set to "−$h_1$" and the preceding and leading bits are both "0." Otherwise, the multiplexer 324 output will be discarded (i.e. in the remaining 25 percent of the transitions where the second slicer threshold th2 318 is set to "−$h_1$" and the preceding and leading bits are both "1", or the second slicer threshold th2 318 is set to "+$h_1$" and the preceding and leading bits are both "0"). This embodiment also achieves unimodal histogram of the edge data with no skew and no need for extra slicer at the cost of discarding only 25 percent of the transitions. Discarding of 25% of the transitions in this embodiment results in some drop in PD gain and higher clock phase uncertainty and jitter compared to the first embodiment.

From the above description it should be understood that the disclosed methods are not limited to quarter-rate architecture and can be applied with minor modification to any full or sub-rate architecture with one or more unrolled DFE taps. The disclosed embodiments are also equally applicable for multilevel signaling such as PAM4. In the disclosed methods while the assumption has been made that the edge path data is obtained from sampling the trailing edge of the eye 104, with minor modification, the herein disclosed methods can be adapted for the case where samples of the leading edge of the eye in the edge path are used instead.

FIG. 4 is a diagram illustrating a threshold circuit 400 for calculating a slicer threshold $S_{opt}$ according to some embodiments. In an embodiment, the threshold circuit 400 is connected to the slicers 320a, 320b of the edge path (FIG. 3B) and implements Equation (1) to provide an $S_{opt}$ signal 418 that may be used as a threshold for slicers 320a, 320b of the edge path. In some embodiments, the threshold circuit 400 generates a positive $S_{opt}$ signal and a negative $S_{opt}$ signal, which are delivered to respective slicers 320a, 320b. The +/−$S_{opt}$ signals may be generated separately, or one of the $S_{opt}$ signals may be generated by the disclosed circuit, and the inverse signal may be generated with an inverter, for example by multiplying by −1, or the like.

A signal multiplier 408 receives the $h_0$ signal 402 and multiples $h_0$ by the multiple 406, which in this embodiment, is 2. The output of the signal multiplier 408 is used as a minuend, or higher value, in a subtractor 412, and $h_1$ is used as the subtrahend, which is subtracted from the signal multiplier 408 output. A subtractor 410 subtracts $h_1$ from $h_0$ and the output of subtractor 410 is multiplied at multiplier 414 by $h_1$. The output of the multiplier 414 is the dividend shown in Equation (1), and the output of subtractor 412 is the divisor. A divider 416 performs division on the outputs from multiplier 414 and subtractor 412. The output of divider 416 is the $S_{opt}$ signal 418. In the illustrated embodiment, the threshold circuit 400 output a positive $S_{opt}$. However, in some embodiments, the output $S_{opt}$ signal 418 may be inverted, for example by multiplying by −1, or either input to the divider 416 may be inverted to give a negative signal $S_{opt}$ 418 value.

While the calculation of the $S_{opt}$ signal 418 for use as a threshold voltage is shown using discrete component in a dedicated circuit, it should be understood that such an embodiment is meant to be illustrative, and is not limiting. In other embodiments, one or more components 406-416 may be implemented as digital or discrete components, analog components or circuits, or software instructions stored on a non-transitory computer readable medium and executed by a processor.

Figure 5:
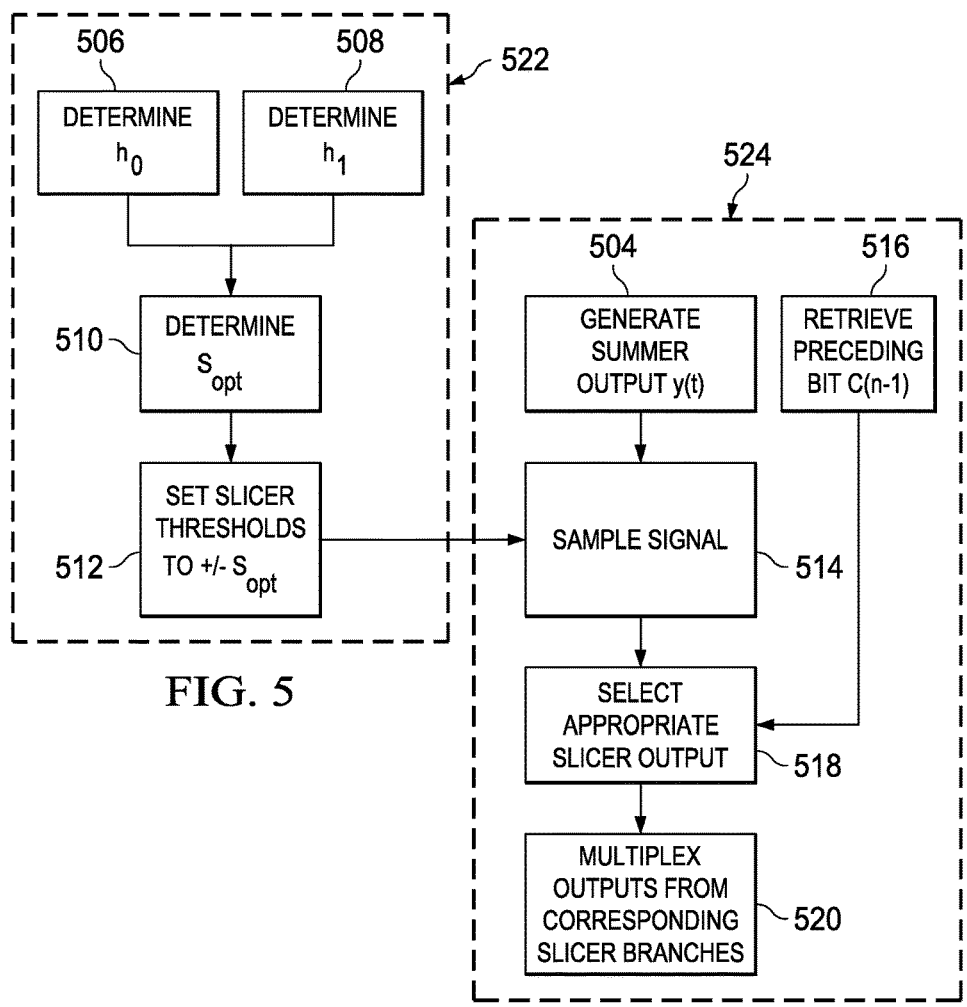
FIG. 5 is a flow diagram illustrating a method for using a slicer arrangement with a slicer threshold in an edge path according to some embodiments.

FIG. 5 is a flow diagram illustrating a method 500 for using a slicer arrangement with a slicer threshold in an edge path 300b according to some embodiments. In block 522, the thresholds +/−$S_{opt}$ (FIG. 2) are generated, and the signal is sliced in block 524 according to the generated thresholds +/−$S_{opt}$. Threshold generation in block 522 is, in some embodiments, performed at a much lower speed than the rate at which the received data signal is sliced in the signal slicing of block 524 at each branch of the edge path. This is mainly because $h_0$ and $h_1$ tend to change very slowly over time, resulting in $S_{opt}$ needing to be updated at a lower rate. As a result, implementing the circuitry shown in FIG. 4 for threshold generation in block 522 of FIG. 5 is simplified and consumes very little power.

In block 506, h0 is determined, and in block 508, h1 is determined. The value for h0 is the nominal or expected value of the received bits in the input signal (see, e.g., FIG. 2) and may be determined as the signal is being received and processed or prior to the signal being received, such as for example, during tuning and setup, or the like. For example, the value for h0 may be a constant, set, or predetermined value that is embedded in the circuit and may, for example, set by a voltage divider, a voltage source, a processor, chip or die that uses a constant or stored value, or the like. In some embodiments the value for h0 is determined on-the-fly by, for example, averaging all of the positive or negative bit values, detecting the type of signal, or the like. In some embodiments, h1 is a voltage value that is calculated from the positive bit deviation from h0, and/or the negative bit deviation from −h0 through averaging. In block 510, $S_{opt}$ 236 is calculated from h0 and h1. Additionally, in some embodiments, two $S_{opt}$ signals, +$S_{opt}$ and −$S_{opt}$ 236 are generated.

In block 504, a summer output is generated through correcting an equalized signal by removing the ISI caused by preceding bits. In some embodiments, the signal is corrected by adding DFE correction for the post-cursor ISI terms (terms 2-15) 312 to the signal 340, as described above.

In block 512, the slicer thresholds are set based on $S_{opt}$. In some embodiments, the slicer system has two slicers, which are set to +$S_{opt}$ and −$S_{opt}$. In block 514, the slicers slice the signal at +$S_{opt}$ and −$S_{opt}$. In block 516, the preceding bit is determined, that is, the bit preceding the transition (from the leading bit to the subsequent bit) being sliced, is determined. The appropriate slicer output is selected in block 518 based on the value of the preceding bit. In some embodiments, the output of the slicer branch which generates the preceding bit is routed to a multiplexer, which, in turn, selects the appropriate slicer output according to the value of the preceding bit. The selected slicer output is then multiplexed with outputs from corresponding slicer branches in block 520.

A circuit according to an embodiment includes a first slicer connected to an input port and a threshold circuit connected to a threshold port of the first slicer and configured to generate a first threshold voltage according to at least a first magnitude of a nominal value of a leading bit in a signal received at the input port. The first slicer is configured to slice the signal according to the first threshold voltage. In some embodiments, the threshold circuit calculates the first threshold voltage according to at least the first magnitude of the nominal value of the leading bit in the signal and a second magnitude of an interference voltage caused, in the leading bit, by a preceding bit. Additionally, the threshold circuit may generate the first threshold voltage according to a height of an intersection point of complimentary and similarly interfered possible transitions in the signal. In an embodiment, a second slicer connected in parallel with the first slicer at the input port, and the threshold circuit is connected to the second slicer which calculate a second threshold voltage according to at least the first magnitude of the nominal value of the leading bit in the signal and having a polarity that is opposite a polarity of the first threshold voltage. In an embodiment, the circuit further includes a multiplexer connected to an output of the first slicer and to an output of the second slicer and the multiplexer selects, according to a value of the preceding bit, an output signal of one of the first slicer and the second slicer as edge path data. The edge path data may have a rate that is about one-quarter of a rate of the signal. In an embodiment, a summer is connected between the input port and the first slicer, and the summer is configured to receive a correcting signal to modify a received signal by removing at least a portion of interference caused by one or more bits coming before a bit preceding the leading bit. In an embodiment, a continuous time linear equalizer (CTLE) circuit is connected to the summer, and the CTLE circuit is configured to equalize a portion of the received signal before the portion of the received signal reaches the summer.

A circuit according to an embodiment includes a plurality of slicer systems, each of the slicer systems having a first slicer connected to an input port and a second slicer connected to the input port in parallel with the first slicer. A threshold circuit is connected to a first threshold port of the first slicer and to a second threshold port of the second slicer, and a first multiplexer is connected to outputs of the first slicer and the second slicer. A second multiplexer is connected to an output of the first multiplexer of each of the plurality of slicer systems. In an embodiment, the threshold circuit has circuitry that generates a first threshold voltage according to at least a first magnitude of a nominal value of a leading bit of an input signal and a second magnitude of an interference voltage caused, in the leading bit, by a preceding bit and provides the first threshold voltage to the first slicer at the first threshold port. The threshold circuit further has circuitry that generates a second threshold voltage that has a same magnitude as a magnitude of the first threshold voltage and that has a polarity that is opposite a polarity of the first threshold voltage and that provides the second threshold voltage to the second slicer at the second threshold port. In an embodiment the first threshold voltage is a height of an intersection point of complimentary and similarly interfered possible transitions in the signal. A selector port of the first multiplexer of each of the plurality of slicer systems may be connected to the output of the first multiplexer of another one of the plurality of slicer systems. In an embodiment, a selector port of the second multiplexer is connected to a first clock signal source. In an embodiment, a clock port of the first slicer and a clock port of the second slicer of each of the slicer systems are connected to a second clock signal source. Each of the slicer systems may further have a summer connected between the input port and the first and second slicers, with the summer connected to a decision feedback equalizer (DFE) circuit having circuitry that generates a DFE correction signal. A continuous time linear equalizer (CTLE) circuit may be connected to the summer of each of the slicer systems at the input port.

A method according to an embodiment includes generating, in a slicer system, a first threshold voltage according to at least a first magnitude of a nominal value of a leading bit of an input signal and further according to a second magnitude of an interference voltage caused, in the leading bit, by a preceding bit. The method further includes providing the first threshold voltage to a first slicer of the slicer system at a first threshold port of the first slicer, receiving the input signal at the first slicer; slicing, by the first slicer, the input signal according to the first threshold voltage, the slicing generating a first output signal. In an embodiment, the generating the first threshold voltage includes generating the first threshold voltage according to a height of an intersection point of complimentary and similarly interfered possible transitions in the signal. In an embodiment, the method further includes generating, in the slicer system, a second threshold voltage according to at least the first magnitude of the nominal value of the leading bit in the input signal and the second magnitude of the interference voltage, the second threshold voltage having a polarity that is opposite a polarity of the first threshold voltage. The method may further include providing the second threshold voltage to a second slicer of the slicer system at a threshold port of the second slicer, receiving the input signal at the second slicer, slicing the input signal by the second slicer according to the second threshold voltage, the slicing generating a second output signal, and selecting, by a multiplexer and according to an output of another slicer system handling a previous bit of the input signal, one of the first output signal and the second output signal, and providing selected signal as a recovered edge data bit signal. In an embodiment, the method further includes equalizing a received signal with a continuous time linear equalizer (CTLE); and generate the input signal by removing, from the equalized receive signal, at least a portion of interference caused by one or more bits coming before the preceding bit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A signal processing circuit, comprising:
a first slicer connected to an input port;
a second slicer connected in parallel with the first slicer to the input port;
a first threshold circuit connected to a first threshold port of the first slicer;
  wherein the first threshold circuit of the first slicer is configured to generate a first threshold voltage according to:

first threshold voltage=$(h_0-h_1)h_1/(2h_0-h_1)$;

wherein $h_1$ is a first magnitude of an interference voltage caused, in a leading bit in a signal received at the input port, by a preceding bit in the signal;
  wherein $h_O$ is a second magnitude of a nominal value of the leading bit in the signal; and
  wherein the first slicer is configured to slice the signal according to the first threshold voltage; and
a second threshold circuit connected to a second threshold port of the second slicer;
  wherein the second threshold circuit of the second slicer is configured to generate a second threshold voltage having a same magnitude as the first threshold voltage and an opposite polarity of the first threshold voltage; and
  wherein the second slicer is configured to slice the signal according to the second threshold voltage.

2. The signal processing circuit of claim 1, further comprising a multiplexer connected to an output of the first slicer and to an output of the second slicer;
  wherein the multiplexer is configured to select, according to a value of the preceding bit, an output signal of one of the first slicer or the second slicer as edge path data.

3. The signal processing circuit of claim 2, wherein the edge path data has a rate that is about one-quarter of a rate of the signal.

4. The signal processing circuit of claim 1, further comprising a summer connected between the input port and the first slicer, wherein the summer is configured to receive a correcting signal to modify a received signal by removing at least a portion of interference caused by one or more bits coming before a bit preceding the leading bit.

5. The signal processing circuit of claim 4, further comprising a continuous time linear equalizer (CTLE) circuit connected to the summer, the CTLE circuit configured to equalize a portion of the received signal before the portion of the received signal reaches the summer.

6. The signal processing circuit of claim 1, wherein a skew of an intersection point of the signal from a nominal zero crossing of the signal is:

skew=$h_1T/2(2h_0-h_1)$ wherein T is a transmitted signal period; and
  wherein the signal processing circuit is configured to adjust a phase of a center path clock to correct the skew.

7. A receiver system comprising:
N parallel 1/N-rate edge path slicer systems where N is an integer referring to an identical path where a received signal is processed;
  wherein the signal processing circuit of claim 1 is one of the 1/N rate edge path slicer systems; and
  wherein each of the 1/N-rate edge path slicer systems is configured to operate at 1/N of a system data rate and offset by 360°/N in phase; and
a multiplexer having inputs coupled to N parallel 1/N-rate edge path slicer systems.

8. A method, comprising:
generating, in a slicer system, a first threshold voltage according to:

first threshold voltage=$(h_0-h_1)h_1/(2h_0-h_1)$ wherein $h_O$ is a first magnitude of a nominal value of a leading bit of an input signal, and
  wherein $h_1$ is a second magnitude of an interference voltage caused, in the leading bit, by a preceding bit;
generating, in the slicer system, a second threshold voltage having a same magnitude as the first threshold voltage and an opposite polarity of the first threshold voltage;
providing the first threshold voltage to a first slicer of the slicer system at a first threshold port of the first slicer;
receiving the input signal at the first slicer;
first slicing, by the first slicer, the input signal according to the first threshold voltage, the first slicing generating a first output signal;
providing the second threshold voltage to a second slicer of the slicer system at a second threshold port of the second slicer;
receiving the input signal at the second slicer;
second slicing, by the second slicer, the input signal according to the second threshold voltage, the second slicing generating a second output signal; and selecting, by a multiplexer according to an output of another slicer system handling a previous bit of the input signal, one of the first output signal or the second output signal as a selected signal, and providing the selected signal as a recovered edge data bit signal.

9. The method of claim 8, further comprising:
equalizing a received signal with a continuous time linear equalizer (CTLE); and
generate the input signal by removing, from the equalized received signal, at least a portion of interference caused by one or more bits coming before the preceding bit.

10. The method of claim 8, wherein a skew of an intersection point of the input signal from a nominal zero crossing of the input signal is:

$$skew = h_1 T/2(2h_0 - h_1)$$

wherein T is a transmitted signal period; and
wherein the method further comprises adjusting a phase of a center path clock to correct the skew.

11. The method of claim 8, wherein the slicer system is one of N edge path slicer systems in a receiver system, and wherein the method further comprises:
operating each of the N edge path slicer systems at 1/N of a system data rate and offset by 360°/N in phase where N is an integer referring to an identical path where a received signal is processed; and
sequentially multiplexing outputs of the N edge path slicer systems to generate corrected signal at the system data rate.

12. A signal processing circuit, comprising:
a slicer system, comprising:
a first slicer connected to an input port;
a second slicer connected to the input port in parallel with the first slicer;
a threshold circuit connected to a first threshold port of the first slicer and to a second threshold port of the second slicer, wherein the threshold circuit comprises:
first circuitry that generates a first threshold voltage according to at least a first magnitude of a nominal value of a leading bit of an input signal and a second magnitude of an interference voltage caused, in the leading bit, by a preceding bit and provides the first threshold voltage to the first slicer at the first threshold port; and
second circuitry that generates a second threshold voltage that has a same magnitude as a magnitude of the first threshold voltage and that has a polarity that is opposite a polarity of the first threshold voltage and that provides the second threshold voltage to the second slicer at the second threshold port; and
a first multiplexer having a first input connected to an output of the first slicer and a second input connected to an output of the second slicer, the first multiplexer having circuitry that connects one of the output of the first slicer or the output of the second slicer to an output of the first multiplexer according to a signal dependent on a value of a previous bit.

13. The signal processing circuit of claim 12, wherein the first threshold voltage is:

$$\text{first threshold voltage} = (h_0 - h_1) h_1 / (2h_0 - h_1)$$

wherein $h_O$ is the first magnitude of the nominal value of the leading bit of the input signal, and $h_1$ is the second magnitude of the interference voltage caused, in the leading bit, by the preceding bit.

14. The signal processing circuit of claim 12, wherein a clock port of the first slicer and a clock port of the second slicer are connected to a clock signal source.

15. The signal processing circuit of claim 14, wherein the clock signal source has circuitry that provides an edge clock signal.

16. The signal processing circuit of claim 12, wherein the slicer system further comprises a summer connected between the input port and the first and second slicers, wherein the summer is connected to a decision feedback equalizer (DFE) circuit having circuitry that generates a DFE correction signal.

17. The signal processing circuit of claim 16, further comprising a continuous time linear equalizer (CTLE) circuit connected to the summer of the slicer system at the input port.

18. The signal processing circuit of claim 13, wherein a skew of an intersection point of the signal from a nominal zero crossing of the signal is:

$$skew = h_1 T/2(2h_0 - h_1)$$

wherein T is a bit period; and
wherein the signal processing circuit is configured to adjust a phase of a center path clock to correct the skew.

19. A receiver system comprising:
N parallel 1/N-rate edge path slicer systems where N is an integer referring to an identical path where a received signal is processed;
wherein the signal processing circuit of claim 12 is one of the 1/N rate edge path slicer systems; and
wherein each of the 1/N-rate edge path slicer systems is configured to operate at 1/N of a system data rate and offset by 360°/N in phase; and
a multiplexer having inputs coupled to N parallel 1/N-rate edge path slicer systems.

* * * * *